United States Patent [19]

Matsumoto et al.

[11] Patent Number: 4,561,032
[45] Date of Patent: Dec. 24, 1985

[54] MAGNETOOPTIC REPRODUCING DEVICE
[75] Inventors: Kazuya Matsumoto; Kiyonobu Endo, both of Yokohama, Japan
[73] Assignee: Canon Kabushiki Kaisha, Tokyo, Japan
[21] Appl. No.: 382,202
[22] Filed: May 26, 1982
[30] Foreign Application Priority Data Jun. 2, 1981 [JP] Japan .................................. 56-85428
Jun. 10, 1981 [JP] Japan .................................. 56-89261
Apr. 28, 1982 [JP] Japan .................................. 57-72363

[51] Int. Cl.⁴ ........................................... G11B 11/00
[52] U.S. Cl. .................................. 360/114; 369/110; 369/14
[58] Field of Search .................. 360/114, 59; 365/122; 369/110, 13; 350/378

[56] References Cited
U.S. PATENT DOCUMENTS 4,409,631 10/1983 Matsumoto ......................... 360/114
4,410,277 10/1983 Yamamoto et al. ................ 360/114

FOREIGN PATENT DOCUMENTS 44241 3/1982 Japan .

OTHER PUBLICATIONS

MnBi Films: High-Temperature Phase Properties and Curie-Point Writing Characteristics, Journal of Applied Physics, vol. 41, No. 6, 1970.

Primary Examiner—Robert L. Richardson
Attorney, Agent, or Firm—Fitzpatrick, Cella, Harper & Scinto

[57] ABSTRACT

In a magnetooptic reproducing device wherein a light beam polarized in a predetermined direction is incident on a magnetic recording medium and signals recorded on the recording medium are optically read by the utilization of the magnetooptic effect, a polarization component of the signal light from the recording medium in a direction perpendicular to a polarization component in the predetermined direction is relatively increased as compared with the latter component, thereby enhancing the utilization efficiency of the signal light in detection and enabling detection of great S/N ratio or observation of a recorded pattern of high visibility. Also, signal recording as well as reproducing can be accomplished by one common optical system.

11 Claims, 18 Drawing Figures

MAGNETOOPTIC REPRODUCING DEVICE

BACKGROUND OF THE INVENTION

1. Field of the Invention

This invention relates to a magnetooptic reproducing device which utilizes a magnetooptic effect to optically reproduce signals recorded on a magnetic recording medium.

2. Description of the Prior Art

Figure 1A:
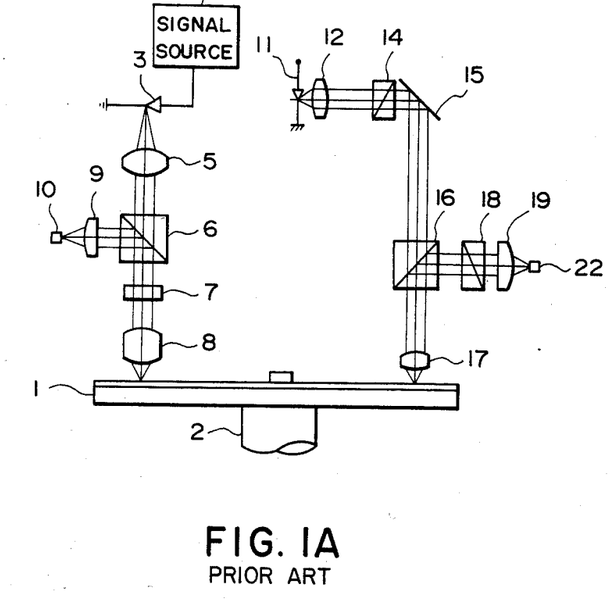
FIG. 1A shows a magnetooptic recording-reproducing device according to the prior art.

A method of optically reading out magnetically recorded information by the use of a magnetooptic effect such as the magnetooptic Kerr effect or Faraday effect is known and particularly, a method comprising condensing linearly polarized light on a magnetic recording medium, passing the light reflected by or passed through the magnetic recording medium through an analyzer, converting the rotation of the plane of polarization into a variation in quantity of light and thereby reading the same has been developed. An example of the device used for such reproduction of recorded information is shown in FIG. 1 of the accompanying drawings.

The Faraday effect refers to the rotation of the plane of polarization by the interaction between the light and the magnetic field as the light passes through the magnetic recording medium, and the Kerr effect refers to the rotation of the plane of polarization as the light is reflected by the magnetic recording medium.

FIG. 1A shows an example of the device for reproducing the signals on a perpendicular magnetic recording medium by utilizing the magnetooptic Kerr effect. In this example, a signal recording system for optically recording information on the perpendicular magnetic recording medium is also shown.

In FIG. 1A, the perpendicular magnetic recording medium 1 is rotated by a motor 2.

The signal recording system is the left half of FIG. 1A, and a light source such as, for example, a semiconductor laser 3 is driven by the video signal from a signal source 4. The modulated recording light beam is collimated into a parallel beam by a collimator lens 5, passes through a polarization beam splitter 6 and a quarter wave plate 7 and forms a focus on the surface of the perpendicular magnetic recording medium with the aid of an objective lens 8. Inversion of magnetic domain is caused by the thermal energy of this point image, whereby a record pattern can be recorded. The light beam for the signal recording system requires great energy for the reason set forth above and therefore, a laser light beam is usually used as such light beam, but the laser light beam from a laser light source is linearly polarized and therefore, if an ordinary half-mirror is used instead of the polarization beam splitter 6, the quantity of light reaching the recording medium 1 will be decreased to one half and this is not preferable. Accordingly, by using a polarization beam splitter having a high transmission factor for the P-polarized light, the plane of polarization of the incident laser light beam can be arranged into the P-polarized state, whereby the loss of quantity of light by the beam splitter can be minimized and a high energy point image can be formed on the recording medium.

The quarter wave plate is for making the incident linearly polarized light into circularly polarized light and making the circularly polarized light beam reflected from the recording medium into linearly polarized light rotated by 90° with respect to the incident light beam, and this reflected light beam now becomes S-polarized light incident on the polarization beam splitter 6 and is reflected at a high reflection factor and received by a four-division detector 10 through a cylindrical lens 9. The system constituted by the cylindrical lens 9 and the detector 10 is for obtaining an auto-focus signal for keeping the spacing between the objective lens 8 and the recording medium 1 constant.

The right half of FIG. 1A shows the reproducing system. A light source 11 uniformly emits light. The reproducing light beam is collimated into a parallel beam by a collimator lens 12 and is caused to form a point image on the recording medium 1 by an objective lens 17 through a polarizing plate 14, a mirror 15 and a half-mirror 16. The perpendicular magnetic recording medium 1 has a signal pattern formed thereon by the difference in direction of magnetization (upward or downward). In accordance with such directions of magnetization, the light beam incident on the recording medium 1 is reflected with the plane of polarization thereof being subjected to rotations in opposite directions by the magnetooptic Kerr effect. For example, if it is assumed that the plane of polarization of the light beam reflected by the downwardly magnetized portion is subjected to rotation of $\theta k$, the plane of polarization of the light beam reflected by the upwardly magnetized portion is subjected to rotation of $-\theta k$.

The polarizing plate 14 is for making the incident light beam into linearly polarized light, and the light beam reflected from the recording medium has a plane of polarization rotated by $+\theta k$ or $-\theta k$ with respect to the plane of polarization of the incident light beam. This reflected light beam is separated from the incident light beam by the half-mirror 16 and, if the axis of polarization (the direction of passage of the plane of polarization) of an analyzer 18 is disposed perpendicular to $-\theta k$, the light beam passing through the analyzer 18 is limited only to the polarized component of a projection component relative to the axis of polarization, of the light beam whose plane of polarization has $+\theta k$. Accordingly, the recorded pattern can be converted into a light-and-dark pattern according to the upward and downward directions of the magnetic domain of the recording medium 1.

Figure 1B:
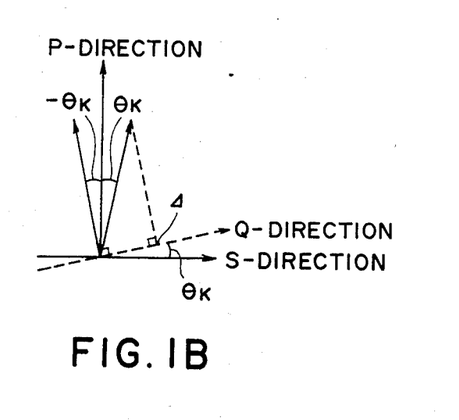
FIG. 1B shows an example of the detection of the signal light in the reproducing system of FIG. 1A.

That is, where the incident light beam is P-polarized light as shown in FIG. 1B and if the transmission of polarized light through the analyzer 6 is in a direction (Q-direction) perpendicular to the direction of polarization $-\theta k$, the reflected light from the upwardly magnetized portion is intercepted by the analyzer 18 and the transmission component $\Delta$ of the reflected light from the downwardly magnetized portion which is to pass through the analyzer 18 passed through the analyzer 18. By this phenomenon, the perpendicularly magnetized pattern can be detected or observed.

This passed light beam is received by a four-division detector 22 through a cylindrical lens 19 and the photoelectrically converted electrical signal is separated into a recording signal and an auto-focus signal and then processed.

If the spacing between the recording medium 1 and the objective lens 17 is changed, the distribution of the line image varies and the focused condition can be detected by detecting the balance between the outputs from the elements of the four-division detector 22.

In this reproducing system, in order that the information on the angle of optical rotation of the modulated light beam emitted from the recording medium may not be lost, the half-mirror 16 for dividing the quantity of light into 50% each independently of the polarized state of the light beam is used as a beam splitter. The transmission factor and the reflection factor of this half-mirror are respectively determined to 50% because this is a value best suited to take out a maximum quantity of modulated light beam so that this set value can be easily calculated.

In the conventional reproducing system as described above, the amplitude is reduced to ¼ because the light beam is passed twice through the half-mirror. Further, the angle of rotation $\theta k$ of the plane of polarization by the Kerr effect is generally very slight, e.g., about 1° or less, and the quantity of light of the modulated component by the magnetooptic effect obtained by the light passing through the analyzer 18 is very minute. Accordingly, there are the following drawbacks in the conventional magnetooptic reproducing device having the reproducing optical system as described above:

1. The quantity of light of the modulated component having information is small as compared with non-information component and therefore, it is not easy to detect the recorded pattern.

2. In order to separate said minute modulated component light from the modulated light beam, a very expensive analyzer must be disposed while being position-adjusted with high accuracy and this is not preferable in respect of cost and durability.

Also, in the magnetooptic reproducing device also having the signal recording system, as shown in FIG. 1A, it has been very much desired, in terms of the versatility and reduction of size and cost of the device, to make the signal recording system and the reproducing system into a common system, namely, a common head. However, in the reproducing system of FIG. 1A, if the recording light beam is caused to enter through the same optical path as the reproducing system light beam, in whatever direction the direction of polarization may be set, the quantity of light will be reduced to ½ by the half-mirror 16 and the energy utilization efficiency will be aggravated, and this is not preferable. Thus, in the conventional magnetooptical reproducing device having a signal recording optical system as well, the recording system and the reproducing system differ from each other in the presence of such a part as the analyzer and moreover, differ in the characteristic which the respective light beams require of the beam splitter, and this has prevented the recording and the reproduction from being arranged into a single system.

SUMMARY OF THE INVENTION

It is an object of the present invention to provide a magnetooptic reproducing device in which a great quantity of light of modulated component can be obtained and signal detection of great S/N ratio is possible.

It is another object of the present invention to provide a magnetooptic reproducing device which enables a magnetic pattern of high visibility to be observed.

It is still another object of the present invention to provide a magnetooptic reproducing device which is capable of effecting the optical recording onto a magnetic recording medium by an optical system common to the reproducing system.

In accordance with one aspect of the present invention, the above objects are achieved by a magnetooptic reproducing device comprising first means for causing a light beam polarized in a predetermined direction to impinge on a magnetic recording medium, second means for relatively increasing the polarization component in a direction perpendicular to said predetermined direction, as compared with the polarization component in said predetermined direction, of the light reflected by or passed through the recording medium, and third means for detecting the light beam from the second means and reading the recorded pattern on the recording medium.

The invention will become more fully apparent from the following detailed description thereof taken in conjunction with the accompanying drawings.

DESCRIPTION OF THE PREFERRED EMBODIMENTS

Figure 2:
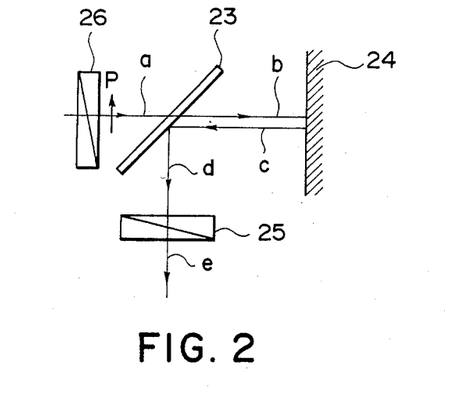
FIG. 2 shows a first embodiment of the optical system according to the present invention.

Referring to FIG. 2 which shows an embodiment of the optical system of the present invention, reference numeral 26 designates a polarizing plate, reference numeral 23 denotes an optical element, reference numeral 24 designates a perpendicular magnetic recording medium, and reference numeral 25 denotes an analyzer. The polarization direction of an incident light beam a is considered with respect to a case where it has been made into P-polarized state parallel to the plane of the drawing sheet by the polarizer 26. The optical element 23 used in the present embodiment, unlike the conventional half-mirror having no polarization characteristic, has such a nature that the transmission factor t and the reflection factor r vary depending on the polarization direction. That is, where the amplitude transmittance of the P-polarization component of the optical element 23 is tp and the amplitude reflectance thereof is rp and the amplitude transmittance of the S-polarization component (in FIG. 2, the polarization component perpendicular to the plane of the drawing sheet) is ts and the amplitude reflectance thereof is rs, the optical element is a beam splitter generally having the characteristics that $|tp|\neq|ts|$ and $|rp|\neq|rs|$.

Figure 3A:
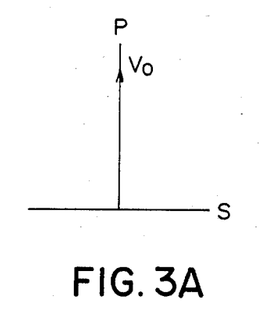
FIGS. 3A–3D show the polarized states of the light beam at respective positions in the optical system of FIG. 2.
Figure 3B:
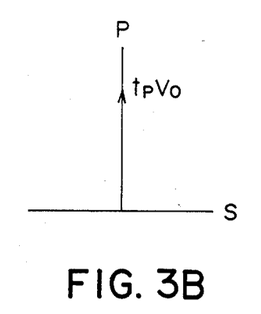

FIGS. 3A–3D show the polarized states of the light beam at respective positions in the optical system of FIG. 2. The incident light beam a passed through the polarizing plate 26, as shown in FIG. 3A, has a polarization component only of P-component relative to the optical element 23. The amplitude thereof is Vo. For simplicity of description, it is assumed that the incident light beam is incident perpendicularly to the recording medium 24 and the amplitude reflectance thereof is R.

Figure 3C:
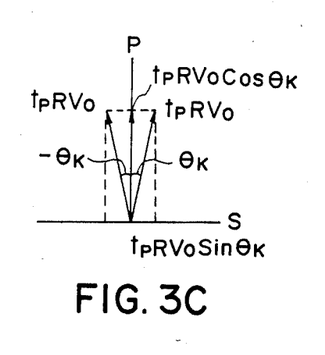

When the light beam b passed through the optical element 23 is reflected by the perpendicular magnetic recording medium 24, the light beam is subjected to the rotation of the plane of polarization of $\theta k$ or $-\theta k$ by the Kerr effect in accordance with the magnetization direction of the area being illuminated by the light beam. Actually, the linearly polarized incident light beam b is made into elliptically polarized light by the Kerr effect and reflected with the plane of polarization thereof rotated, but herein only the major axis direction component light of this elliptically polarized light is considered, and the then state of the light beam is shown in FIG. 3C.

The amplitude component of the light beam is tpRVo, and the direction of the plane of polarization is $+\theta k$ or $-\theta k$ with respect to a reference axis which is the initial polarization direction. Accordingly, the amplitude of the P-component of the light beam is tpRVo $\cos(\pm\theta k)$, and the amplitude of the S-component of the light beam is tpRVo $\sin(\pm\theta k)$.

Figure 3D:
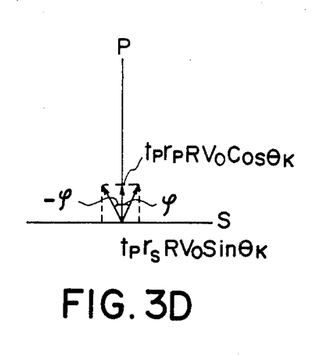

FIG. 3D shows the state of the light beam d after the light beam c modulated by the recording medium 24 has been reflected by the optical element 23. The polarized state of this light beam is changed from the state of the light beam c by the reflection of the optical element 23, and due to the reflection factors of the optical element 23 for respective components, the amplitude of the P-component becomes tprpRVo $\cos(\pm\theta k)$ and the amplitude of the S-component becomes tprsRVo $\sin(\pm\theta k)$.

Accordingly, by synthesizing the amplitudes of the respective components, the amplitude of the light beam d is $$Vd = tpRVo\, rp \sqrt{1 + \left(\frac{rs^2}{rp^2} - 1\right)\sin^2(\pm\theta k)} \quad (1)$$

and the angle $\phi$ formed by the plane of polarization of the modulation light beam with the reference axis is $$\pm\theta = \tan^{-1}\left\{\frac{rs}{rp}\tan(\pm\theta k)\right\} \quad (2)$$

(The reference axis lies in a plane equivalent to the plane of polarization of the incident light beam in this optical system.) That is, the rotation angle $\theta k$ of the plane of polarization is converted into the angle $\phi$. If rs>rp at this time, the Kerr rotation angle $\theta k$ is enlarged into the angle $\phi$ as can readily be seen from equation (2).

Thus, by a beam splitter or the like having a different transmission factor and reflection factor depending on the polarization direction, of the light reflected by the recording medium, the polarization component in a direction perpendicular to the polarization component of the incident light beam is relatively increased as compared with the latter component, whereby the Kerr rotation angle can be enlarged and detected with the result that the S/N ratio of signal detection is improved.

While the foregoing embodiment has been described with respect to the signal reproduction utilizing the Kerr effect, the rotation angle of the plane of polarization can likewise be increased in a reproducing device using the Faraday effect.

In the reproducing optical system shown in FIG. 2 which utilizes the Kerr effect, the polarization characteristic of the optical element 23 which is most effective to enhance the S/N ratio and which enables a magnetic pattern of high visibility to be observed will now be considered. In FIGS. 3A to 3D, attention has been paid only to the rotation of the plane of polarization by the Kerr effect, for simplicity of description, but with the elliptically polarized light being also taken into account, it is necessary to obtain the polarization characteristic of the optical element 23 so that the quantity of the detected light e in FIG. 2 may become maximum.

The polarization characteristics of the optical element 23, the perpendicular magnetic recording medium 24 and the analyzer 25 in FIG. 2 may be expressed in the well-known form of a Jones matrix as follows. First, the transmission Jones matrix $\mathbb{T}$ and the reflection Jones matrix $\mathbb{R}$ of the optical element 23 are $$\mathbb{T} = \begin{bmatrix} tp, & 0 \\ 0, & ts \end{bmatrix}, \quad \mathbb{R} = \begin{bmatrix} rp, & 0 \\ 0, & rs \end{bmatrix} \quad (3)$$

With regard to the perpendicular magnetic recording medium 24, if the medium amplitude reflectance during perpendicular incidence is R and the Kerr rotation amplitude reflectance by the magnetooptic Kerr effect is K, the medium Jones matrix $\mathbb{M}$ may be expressed as:

$$\mathbb{M} = \begin{bmatrix} -R, & K \\ K, & R \end{bmatrix} \quad (4)$$

Figure 4:
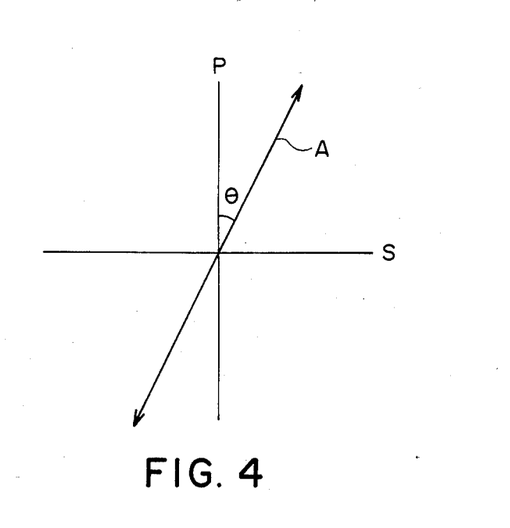
FIG. 4 shows the orientation of the transmission axis of the analyzer relative to the polarization direction.

With regard to the analyzer 25, if the extinction factor is $\eta$ when the transmission axis A of the analyzer is inclined by an angle $\theta$ in the S-polarization direction relative to the P-polarization direction as shown in FIG. 4, the transmission Jones matrix $\mathbb{A}$ becomes:

$$\mathbb{A} = \begin{bmatrix} \cos\theta, & -\sin\theta \\ \sin\theta, & \cos\theta \end{bmatrix} \begin{bmatrix} 1, & 0 \\ 0, & \eta \end{bmatrix} \begin{bmatrix} \cos\theta, & \sin\theta \\ -\sin\theta, & \cos\theta \end{bmatrix} \quad (5)$$

$$= \begin{bmatrix} \cos^2\theta + \sqrt{\eta}\sin^2\theta, & \frac{1}{2}(1 - \sqrt{\eta})\sin 2\theta \\ \frac{1}{2}(1 - \sqrt{\eta})\sin 2\theta, & \sin^2\theta + \sqrt{\eta}\cos^2\theta \end{bmatrix}$$

Accordingly, in FIG. 2, if the Jones vector representing the polarized state of the detected light e passed through the analyzer 25 is $\mathbb{D}$, $\mathbb{D}$ may be expressed as $$\mathbb{D} = \mathbb{A}\,\mathbb{R}\,\mathbb{M}\,\mathbb{T}\,\mathbb{E} \quad (6)$$

with the Jones vector of the light beam a as . If the light beam a is linearly polarized light in the P-polarization direction as previously described and the amplitude thereof is Vo, the intensity I of the detected light e passed through the analyzer 25 may be expressed as follows by the use of equations (3), (4), (5) and (6):

$$I = |V_0|^2 |tp|^2 [|R|^2 |rp|^2 (\cos^2\theta + \eta \sin^2\theta) - |R||K||rp||rs|(1-\eta)\cos\delta \sin 2\theta] \quad (7)$$

where $R = |R|e^{i\alpha}$, $K = |K|e^{i\beta}$, $rp = |rp|e^{irp}$, $rs = |rs|e^{irs}$, $\delta = \alpha - \beta + rp - rs$ and the term $|K|^2$ is omitted because of the small magnitude of the second order.

The first term of the right side of equation (7) means the light intensity $I_R$ of the DC component of the detected light, namely, the polarization direction component of the incident light beam, and the second term means the light intensity $I_K$ of the modulation (AC) component by the perpendicular magnetic recording medium 24, namely, the Kerr rotation modulation component.

By considering the orientation angle $\theta$ of the transmission axis of the analyzer 25 from equation (7), $I_K$ can be varied and the extinction imperfectness of the analyzer can be compensated for. By the orientation angle $\theta$ of the transmission axis of the analyzer being 45°, $I_K$ becomes maximum.

Also, where the magnetic pattern is to be visualized and observed by the naked eye or the like, the visibility $V[\equiv(Imax-Imin)/(Imax+Imin)]$ must be enhanced. In this case, with $I_K \neq 0$, that is, $\sin 2\theta \neq 0$, the visibility becomes as follows:

$$V \propto \left[ \frac{|R||rp|}{2|k|\cos\delta} \left( \frac{1}{\tan\theta} + \eta\tan\theta \right) + (1-\eta)|rs| \right]^{-1} \quad (8)$$

The orientation $\theta_o$ of the analyzer 25 which renders the then V maximum is obtained as $$\theta_o = \tan^{-1}(1/\sqrt{\eta}) \quad (9)$$

Figure 5:
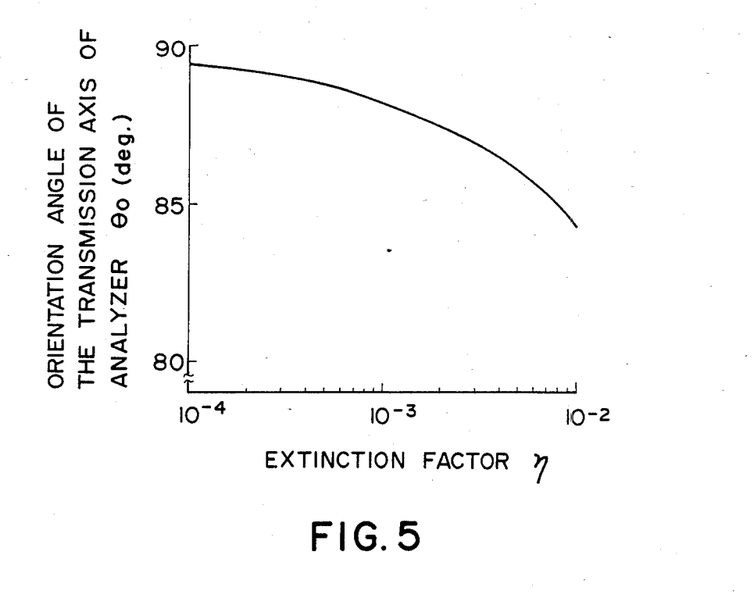
FIG. 5 shows an optimum orientation angle of the transmission axis of the analyzer for obtaining a maximum visibility relative to the extinction factor of the analyzer in the first embodiment.

The extinction factor $\eta$ of the usually used polarizer is of the order of $10^{-4}$ to $10^{-2}$, and as can be seen from FIG. 5, $\theta_o$ is in the range of $84° < \theta_o < 89.5°$ and the orientation angle of the transmission axis of the analyzer for which the maximum visibility is obtained relative to the characteristic of the analyzer used can be set.

From equation (5), it is possible to vary the relative values of $I_R$ and $I_K$ by providing the transmission factor and reflection factor of the optical element 23 with polarization characteristic. As a result, $I_K$ can be apparently increased so as to compensate for the reduction of $I_K$ resulting from the extinction imperfectness of the analyzer 25. If the absorption of the optical element 23 is negligible, with $|tp|^2 = 1 - |rp|^2$ and from equation (7), $$I_R \propto (1 - |rp|^2)|rp|^2 \quad (10)$$

$$I_K \propto (1 - |rp|^2)|rp||rs| \quad (11)$$

From the above, it will be seen that $I_R$ becomes maximum for $|rp|^2 = 0.5$ independently of $|rs|^2$ and $I_K$ becomes maximum for $|rp|^2 = 0.33$. Also, $I_K$ becomes maximum for $|rs|^2 = 1.0$.

Figure 6:
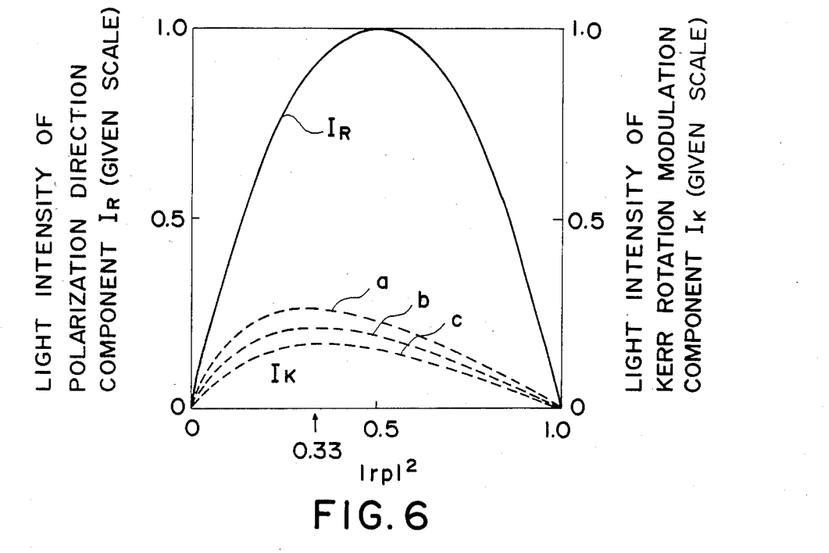
FIG. 6 shows the dependence of the light intensity of polarization direction component and light intensity of Kerr rotation modulation component with respect to the polarization characteristic of the optical element used in the first embodiment.

FIG. 6 shows the dependence of $I_R$ and $I_K$ on the polarization characteristic of the optical element 23 as obtained from formulas (10) and (11) above. The solid line indicates the light intensity $I_R$ of polarization direction component and the broken lines indicate the light intensity $I_K$ of Kerr rotation modulation component, the line a referring to a case where $|rs|^2 = 0.9$, the line b referring to a case where $|rs|^2 = 0.7$ and the line c referring to a case where $|rs|^2 = 0.5$.

From FIG. 6, it will be seen that in the recorded pattern reading optical system as shown in FIG. 2 which uses the magnetooptic Kerr effect, for the same value of $|rp|^2$, the use of an optical element in which $|rs|^2$ is 90% results in obtaining about 1.4 times $I_K$ as compared with a case where use is made of a conventional half-mirror in which both $|rp|^2$ and $|rs|^2$ are 50%, and enables a light magnetic pattern to be detected. Further, the use of an optical element in which $|rp|^2$ is about 33% results in obtaining a maximum value of $I_K$ at least 1.5 times greater than in the conventional case. If $0.18 < |rp|^2 < 0.52$, a value of more than 90% of the maximum value of $I_K$ is obtained and therefore, if $|rp|^2$ is set within the aforementioned range, a sufficient effect can be obtained. Also, where the visibility v is to be enhanced, it is desirable to set $|rs|^2$ to the greatest possible value and set $|rp|^2$ to the smallest possible value. The optical element having such polarization characteristic can be manufactured in the same manner as a usual polarization beam splitter.

Figure 7A:
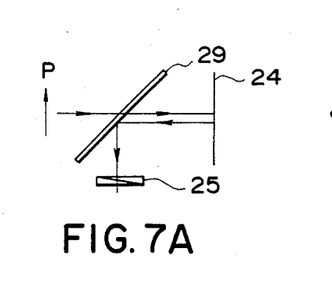
FIGS. 7A–7D and FIGS. 8A and 8B show optical systems according to further embodiments of the present invention.

The observation or detection method in the above-described embodiment has been concerned with the system shown in FIG. 7A. The optimum conditions of the characteristics of respective optical elements 23 will now be obtained with respect to another embodiment of the observation or detection method using an optical element 23.

Figure 7B:
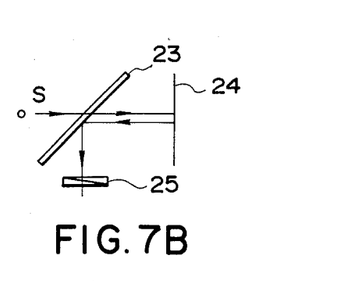

A case where the light beam enters the optical element 23 in the S-polarized state as shown in FIG. 7B will now be considered. The quantity of light passing through the analyzer 25 is obtained as $$I_R \propto (1 - |rs|^2)|rp|^2 \quad (12)$$

$$I_K \propto (1 - |rp|^2)|rp||rs| \quad (13)$$

through the same deriving process as that in the case of FIG. 7A. If, in formulas (10) and (11), rp is substituted by rs and rs is substituted by rp, the two formulas will become entirely coincident with each other. From this result, the dependence of $I_R$ and $I_K$ on $|rp|^2$ and $|rs|^2$ can be depicted and with the greater $|rp|^2$, the greater value of $I_K$ is obtainable and further, when $|rs|^2$ is about 33%, $I_K$ can be rendered into a maximum value. Also, to make the visibility V greater, it is preferable to make $|rs|^2$ smaller.

As discussed above, FIG. 7A and 7B are for a case where the light beam passing through the optical element to the recording medium 24 again enters the optical element 23 and is reflected thereby to be detected by the analyzer 25.

In a converse case, namely, in a case where the light beam is reflected by the optical element 23 and further reflected by the recording medium 24 and thereafter passes through the optical element 23, the Jones vector D expressed by equation (6) in the previously described example becomes $$D = A\ T\ M\ R\ E \quad (14)$$

Figure 7C:
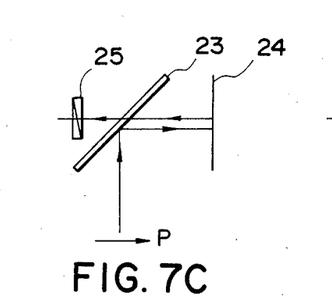

Accordingly, where, as shown in FIG. 7C, the light beam enters the optical element 23 in P-polarized state, by substituting tp for rp and ts for rs in formulas (10) and (11), $$I_R \propto (1-|tp|^2)|tp|^2 \quad (15)$$

$$I_K \propto (1-|tp|^2)|tp||ts| \quad (16)$$

are obtained, and by increasing $|ts|^2$ and rendering $|tp|^2$ into about 33%, $I_K$ becomes maximum and a light magnetic pattern can be detected. With regard also to the visibility V, it is preferable that $|tp|^2$ be made as small as possible in the same manner as previously described.

Figure 7D:
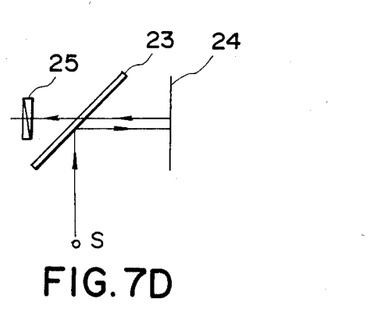

Where, as shown in FIG. 7D, the light beam enters the optical element 23 in S-polarized state, the intensity of the light passing through the analyzer 25 can likewise be derived by $$I_R \propto (1-|ts|^2)|ts|^2 \quad (17)$$

$$I_K \propto (1-|ts|^2)|ts||tp| \quad (18)$$

If rp is substituted by ts and rs by tp in formulas (10) and (11), these formulas will become coincident with formulas (17) and (18), respectively, and if $|tp|^2$ is increased and $|ts|^2$ is rendered to be about 33%, a light magnetic pattern can be detected. Also, to make the visibility V greater, $|ts|^2$ may be made smaller.

Figure 8A:
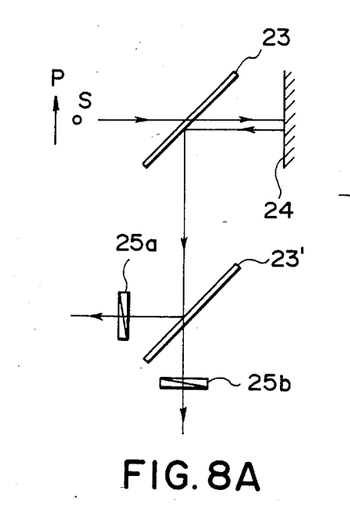
Figure 8B:
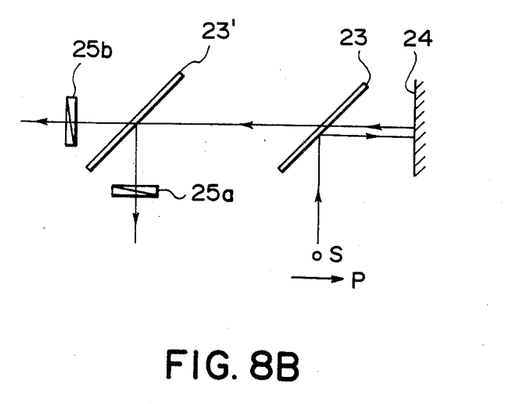

The above discussion can also apply to a case where, as shown in FIGS. 8A and 8B, the light from the optical element 23 is further divided by an optical element 23'. In the case of FIG. 8A, upon P-polarization incidence, $$D = A^a R' R M T E \quad (19)$$

$$D = A^b T' R M T E \quad (20)$$

and with regard to the light from the analyzer 25a, in formulas (10) and (11), rp may be substituted by rprp', rs by rsrs' and $\theta$ by $\theta a$ and, with regard to the detected light from the analyzer 25b, rp may be substituted by rptp', rs by rsts' and $\theta$ by $\theta b$.

At this time, for the detected light divided, the relative values of the light intensity of polarization direction component and the light intensity of Kerr rotation modulation component can be varied by suitably selecting the transmission axis directions $\theta a$ and $\theta b$ of the optical element 23 and analyzers 25a, 25b. With the arrangement as shown in FIG. 8A, it is generally usual that the light beams divided by the optical element 23' are received by photodetectors and electrical differential detection is effected. In this case, it is desirable that $\theta a = -\theta b$ and further, the divided light beams be equal in the relative values of the light intensity of polarization direction component and the light intensity of Kerr rotation modulation component. Accordingly, in the case of such electrical differential detection, it is preferable that a half-mirror having the characteristics $|rs'|=|ts'|$ and $|rp'|=|tp'|$ and having no polarization characteristic be used as the optical element 23'. Of course, however, with the differential imperfectness, etc. by the detection processing system taken into account, use may also be made of a half-mirror having polarization characteristic. Again in the case of S-polarization incidence, rp' may be substituted by rs', rs' by rp', tp' by ts' and ts' by tp' and entirely the same discussion can apply.

FIG. 8B shows a case where in an optical system similar to that of FIG. 7C or 7D, the light to be detected is divided by the optical element 23'. At this time, for P-polarization incidence, in formulas (10) and (11), with regard to the light passing through the analyzer 25a, tp is substituted by tptp', ts by tsts' and $\theta$ by $\theta a$, and with regard to the light passing through the analyzer 25b, tp is substituted by tprp'; ts by tsrs' and $\theta$ by $\theta b$ and entirely the same discussion as that regarding FIG. 8A can apply. Again in the case of S-polarization incidence, tp' may be substituted by ts', ts' by tp', rp' by rs' and rs' by rp'.

In the above-described embodiments of the present invention, the transmission factor or the reflection factor of the optical element disposed in the reading optical system is made to differ for each polarization component to control the amount of transmission or the amount of reflection of the light beam, whereby the Kerr rotation modulation component by the magnetooptic Kerr effect is relatively increased as compared with the polarization direction component of the incident light beam and a magnetic pattern of high visibility is observed. Also, the S/N ratio in the signal detection is improved.

Figure 9:
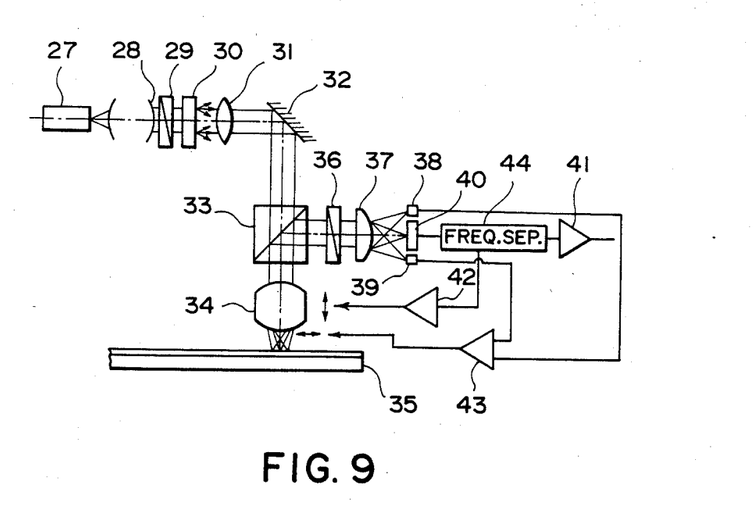
FIG. 9 shows an embodiment in which the magnetooptic reproducing device of the present invention is applied to a disc memory.

Reference is now had to FIG. 9 to describe an embodiment in which the present invention is applied to a disc memory, a video disc or the like of the photomagnetic recording type.

In FIG. 9, reference numeral 27 designates a light source such as semiconductor laser or He-Ne laser. Designated by 28 is a collimating optical system for collimating the light beam from the light source into a parallel beam. Denoted by 29 is a polarizing plate having its axis so disposed that the incidence polarization plane is in P-polarization relative to an optical element 33 described in connection with the previous embodiment. Reference numeral 30 designates a phase diffraction grating which effects the beam angle separation for forming subspots for tracking-detection on a perpendicular magnetic recording medium 35 through an objective lens 34. A lens 31 has the function of imaging of the diffraction grating 30 near the pupil of the objective lens 34, whereby the interception of the angle-separated light in the system up to the objective lens 34 can be prevented. Denoted by 32 is a mirror for bending the optical axis by 90° to direct the light toward the objective lens 34. The optical element 33 described in connection with FIG. 2 is disposed in place of the conventionally used half-mirror. Through the objective lens 34, spots are formed on the rotating perpendicular magnetic recording medium 35.

The spots total to three, namely, two for tracking-signal detection and one for RF signal detection, owing to the angle separating action of the diffraction grating 30.

The light beam subjected to Kerr rotation and reflected by the perpendicular magnetic recording medium is separated from the incident light beam by the optical element 33 and the separation of the polarization component is effected by an analyzer 36. Designated by 37 is an optical system having astigmatism. This is necessary chiefly to detect an automatic focusing signal for controlling the focusing condition of the objective lens by a four-division light receiving element 40.

The electrical signal provided by the four-division light receiving element is separated into an automatic focusing signal and an RF signal in a suitable frequency zone by a frequency separator 44. The RF signal is amplified by an amplifier 41, whereafter it is supplied to a signal demodulating system. The automatic focusing signal is sent to a driver 42, which controls the focusing condition of the objective lens in accordance with the signal.

On the other hand, the light beams separated by the optical system 37 are detected by photodetectors 38 and 39, and those signals are differentiated by a differentiator 43, whereafter they are used to control the horizontal direction of the objective lens through the driver, thereby effecting the tracking.

By the above-described construction, reproduction of a file memory, a video disc or the like using a perpendicular magnetic recording medium can be effected.

Figure 10:
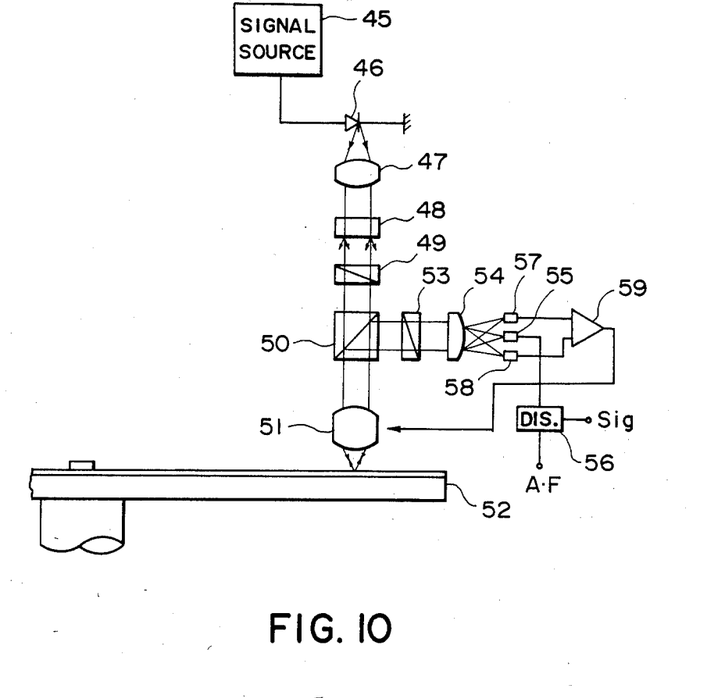
FIG. 10 shows a disc memory having a common optical system for recording and reproducing.

Further, the present invention enables, in a magnetooptic reproducing device also having the optical signal recording system illustrated in FIG. 1A in connection with the prior art, a common beam splitter having the same polarization dependence to be used in both the recording system and the reproducing system on the basis of the fact described in connection with FIG. 2. FIG. 10 shows an embodiment of the present invention in which such a magnetooptic recording-reproducing device is applied to a video disc.

Referring to FIG. 10, description will first be made of a case where the signal recording is effected. By a drive signal from a signal source 45, a light source 46 such as a semiconductor laser emits light intermittently. The light beam emitted by the light source 46 is collimated by a collimator lens 47 and passes through a grating 48, a polarizing plate 49 and an optical element 50 as shown in FIG. 2. Through an objective lens 51, a point image is formed on a perpendicular magnetic recording medium 52. The semiconductor laser light is substantially P-polarized relative to the optical element 50, and a polarizing plate 53 is also installed with the polarization direction thereof disposed in the P-direction.

The optical element 50, as described in connection with FIG. 2, has a high transmission factor for P-polarized light and therefore, it can minimize the loss of quantity of light and can form a high energy point image on the recording medium.

The grating 48 effects the beam angle separation for forming subspots for tracking detection on the perpendicular magnetic recording medium 52 through the objective lens 51.

At this time, by the action of the grating 48, three point images are formed on the recording medium 52. Of these three point images, the two point images to be used for the tracking-signal detection during reproduction are the positive first order and negative first order diffracted light of the grating 48 and the remaining one point image is non-diffracted light (zero order light). By setting the diffraction efficiency of the grating 48, it is easy not to effect signal recording by these two point images but to effect signal recording only by the point image of non-diffracted light.

The combination of a cylindrical lens 54 and a four-division detector 55 is for obtaining an auto-focus signal for a adjusting the position of the objective lens 51 in order to form the point images at the correct focuses.

The signal from the four-division detector 55 is divided into two by a signal distributor 56, one for the auto-focusing and the other for the recorded signal monitoring.

During the recording, the differential signals from detectors 57 and 58 for tracking-signal detection are OFF.

Description will now be made of a case where signal reproduction is to be effected. A constant level signal is supplied to the light source 46 from the signal source 45 to render the light source capable of emitting a constant quantity of light. The quantity of light is adjusted so that the magnetic domain pattern by the signals recorded as previously described is not inverted. The light beam passed through the collimator 47, the grating 48, the polarizing plate 49 and the optical element 50 shown in FIG. 2 forms three point images on the recording medium with the aid of the objective lens 51. The light beam from the recording medium 52 is subjected to the modulation of the plane of polarization by the Kerr effect and enters the detectors 55, 57 and 58 while being light-and-dark modulated by a system comprising the light dividing optical element 50 and analyzer 53. The signal from the detector 55 is distributed into two, one for the auto-focusing and the other for the reproducing.

Also, the signals of the detectors 57 and 58 are differentiated by a differential amplifier 59, and in accordance with the signal from the amplifier the objective lens is moved to left or right to thereby effect the tracking.

The action of the optical element 50 during such signal reproduction is similar to what has been described in connection with FIGS. 2, 3, 4, 5 and 6, and a magnetic pattern of high visibility is observed or signal detection of great S/N ratio is effected.

As a means for adjusting the quantity of light between recording and reproduction, a Faraday rotation element may be interposed between the optical element 50 and the recording medium 52.

The Faraday rotation element is made of glass or the like doped, for example, with YIG crystal or rare earth material, and by a magnetic field being applied thereto, it can rotate the plane of polarization of a light beam. The reason why this Faraday rotation element is used is as follows.

The polarization direction of the reflected light from the recording medium 52 during recording differs from the polarization direction of the reflected light during reproduction subjected to the Kerr rotation. Accordingly, the reflected light beam is separated from the incident light beam by the light dividing optical element 50, and the quantity of light passing through the analyzer 53 differs.

Also, during reproduction, the quantity of light emitted by the light source must be made smaller than during recording so that the recorded magnetic domain pattern may not be inverted and therefore, from this factor, the quantity of light passing through the analyzer 53 differs between the time of recording and the time of reproduction.

If the quantity of light directed through the cylindrical lens 54 to the four-division detector 55 for detecting the recorded signal and the auto-focus signal differs greatly, there arises the necessity of changing over the sensitivity of the detector 55 between the time of recording and the time of reproduction.

The Faraday rotation element under suitable application of a magnetic field during recording rotates the plane of polarization of the recording light beam, whereby the quantity of light entering the detector 55 is adjusted by the combination of the optical element 50 and the analyzer 53, thereby solving the above-noted problem.

Thus, the present embodiment uses, in a magnetooptic reproducing device utilizing the Kerr effect, an optical element having polarization dependability as the beam splitter, thereby enabling optical recording to be also accomplished by an optical system common to that of the reproducing system.

As has hitherto been described, the present invention, as compared with the conventional magnetooptic reproducing device, has the effects that it enables a magnetic pattern of high visibility to be observed and that it increases the S/N ratio of signal detection. Further, the present invention increases the light intensity of modulation component by the magnetooptic effect, and this leads to the ease with which this component is separated by the analyzer, which in turn leads to the possibility that an analyzer lower in performance and accordingly less expensive than the conventional analyzer may be employed. Also, in the magnetooptic reproducing device of the present invention, the recording optical system may be common to the reproducing optical system of the device and this leads to the provision of a compact, inexpensive and novel recording-reproducing device.

What is claimed is:

1. A magnetooptic reproducing device comprising first means for causing a light beam linearly polarized in a predetermined direction to be incident on a magnetic recording medium on which information is magnetically recorded, second means for relatively increasing a polarization component in a direction perpendicular to a polarization component in said predetermined direction, as compared with the latter component, of the light reflected by or passed through said recording medium, wherein the polarization direction of the light reflected by or passed through said recording medium is rotated through a predetermined angle in a predetermined rotational direction in accordance with said information, and wherein said second means further rotates the polarization direction in said predetermined rotational direction, and third means for detecting the polarization direction of the light beam form said second means and reading the recording pattern on said recording medium.

2. The device according to claim 1, wherein said second means is an optical element having a different transmission factor and reflection factor depending on the polarization direction and separating the light beam entering said magnetic recording medium and the reflected light beam from said magnetic recording medium.

3. The device according to claim 2, wherein the polarization dependence of said optical element is set so as to increase the light intensity of the modulation component by the magnetooptic Kerr effect of said reflected light beam.

4. The device according to claim 3, wherein the intensity transmission factor of said optical element for the polarized light in said predetermined direction is in the range of 18–52%, and said detecting means detects the light beam passed through said optical element.

5. The device according to claim 3, wherein the intensity reflection factor of said optical element for the polarized light in said predetermined direction is in the range of 18–52%, and said detecting means detects the light beam reflected by said optical element.

6. The device according to claim 3, wherein said third means includes an analyzer installed so that the orientation angle of the transmission axis thereof is an angle of about 45° with respect to said predetermined polarization direction.

7. The device according to claim 2, wherein the polarization dependence of said optical element is set so as to increase the visibility of said reflected light beam.

8. The device according to claim 7, wherein said third means includes an analyzer installed so that the orientation angle of the transmission axis thereof is an angle in the range of 84°–89.5° with respect to said predetermined polarization direction.

9. The device according to claim 1, wherein said third means divides the light from said second means and differentially detects the divided light beams.

10. A magnetooptic reproducing device comprising first means for selectively causing one of a recording or a reproducing light beam linearly polarized in a predetermined direction to enter a magnetic recording medium on which information is magnetically recorded at least partly through a common optical path, an optical element provided in said common optical path and having a transmission factor and reflection factor of such polarization dependence as to relatively increase a polarization component in a direction perpendicular to a polarization component in said predetermined direction, as compared with the latter component, of the light reflected by said magnetic recording medium, wherein the polarization direction of the light reflected by said recording medium is rotated through a predetermined angle in a predetermined rotational direction in accordance with said information, and wherein said optical element further rotates the polarization direction in said predetermined rotational direction, said optical element separating said recording or reproducing light beam and said reflected light beam, and second means for detecting the polarization direction of the light beam from said optical element and reading the recording pattern on said magnetic recording medium.

11. A device according to claim 10, wherein a Faraday rotation element is provided between said optical element in said common optical path and said magnetic recording medium.

* * * * *

UNITED STATES PATENT AND TRADEMARK OFFICE
CERTIFICATE OF CORRECTION

PATENT NO. : 4,561,032
DATED : December 24, 1985
INVENTOR(S) : Kazuya Matsumoto

It is certified that error appears in the above-identified patent and that said Letters Patent is hereby corrected as shown below:

Col. 6, line 65, change "as ." to --as E.--.

Col. 9, lines 30-2 change " $D = A\ a\ R'\ R\ M\ T\ E$  to  $D = A\ b\ T'\ R\ M\ T\ E$"

-- $Da = A\ a\ R'\ R\ M\ T\ E$
   $Db = A\ b\ T'\ R\ M\ T\ E$ --.

Col. 11, line 55, change "for a adjusting" to --for adjusting--.

Col. 13, line 35, change "form said" to --from said--.

Signed and Sealed this

Twenty-first Day of October, 1986

[SEAL]

Attest:

DONALD J. QUIGG

Attesting Officer

Commissioner of Patents and Trademarks